United States Statutory Invention Registration [19]

Keown et al.

[11] Reg. Number: H343

[43] Published: Oct. 6, 1987

[54] FIBER ARRAY REINFORCED KINETIC ENERGY PENETRATOR AND METHOD OF MAKING SAME

[75] Inventors: William P. Keown, West Milford; Donald T. Rorabaugh, Budd Lake, both of N.J.

[73] Assignee: The United States of America as represented by the Secretary of the Army, Washington, D.C.

[21] Appl. No.: 24,093

[22] Filed: Mar. 2, 1987

[51] Int. Cl.[4] ..... F42B 11/14

[52] U.S. Cl. ..... 102/517; 29/1.2

*Primary Examiner*—Harold J. Tudor

*Attorney, Agent, or Firm*—Anthony T. Lane; Harold H. Card, Jr.; Michael C. Sachs

[57] ABSTRACT

An improved fiber reinforced penetrator rod for a kinetic energy projectile having enhanced penetrating strength is disclosed herein. Embedded in a matrix medium of depleted uranium, or liquid phase sintered tungsten, are long fibers of tungsten-hafnium-carbide which are knitted into a continuous weave over the entire length of the fibers. This prevents splaying open or splitting of the front end of the fibers, and hence of the whole penetrator rod front end, upon impact, penetration, and receiving of the compressive forces upon hitting an armor target.

15 Claims, 14 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIBER ARRAY REINFORCED KINETIC ENERGY PENETRATOR AND METHOD OF MAKING SAME

GOVERNMENTAL INTEREST

The invention described herein may be made, used, or licensed by or for the Government for governmental purposes, without the payment to us any royalties thereon.

BACKGROUND AND FIELD OF THE INVENTION

This invention relates to the field of kinetic energy projectiles which employ long rod cores as penetrators, used for example to pierce armor upon impact. More particularly, the invention relates to a strengthened penetrator rod, by varying the materials and construction thereof.

The quest for ever stronger penetrators, to defeat ever thicker and harder enemy armor, is a continuous one. One conventional type is made of tungsten. The typical method for fabricating penetrators from tungsten involves the use of tungsten powder metal, which is mixed with other metal powders, compacted to shape, sintered, and processed into penetrators. One of the limiting factors for penetrator usage is the inability to obtain high enough metallurgical properties (strength, toughness, etc.) with the penetrator materials currently available. Additional materials used for penetrators include depleted uranium (DU) and liquid phase sintered (LPS) tungsten metals and alloy variations thereof. Another aspect includes composite additions to the metal long rod, such as fiber reinforcement. With fiber reinforcement, an appropriate fiber array is encapsulated by a plastic or metal matrix, producing a composite material with improved properties. The fibers must not dissolve in the encapsulating medium; they should remain intact and be wetted and encased by the matrix medium.

Composite studies with long rod projectiles have included straight fibers, chopped fibers, and rolled sheet; this last item consists of a thin sheet of material rolled into a helix before being encapsulated. These long rods have improved tensile properties which helps the projectile to resist both tensile stresses during launch and bending stresses when penetrating multilayered oblique armor targets. Unfortunately, because of the open endedness of the fibers or sheet at the impact end of the penetrator, the front end of the composite long rod splays open or splits apart under the compressive forces generated during ballistic impact; this significantly reduces penetration ability.

Any improvement therefore, of the strength, toughness, etc. of long rod penetrators in general and of fiber reinforced rods in particular, would be seen as a great advance in this art.

BRIEF SUMMARY OF THE INVENTION

This invention proposes to improve the launch and/or penetration ability of long rod projectiles by retaining the desirable characteristics of fibers and at the same time laying up the fibers in such a manner as to prevent the striking end of the penetrator from splaying out. The fibers either are curved back upon themselves at the striking end, or they are woven together; this will hold the end of the penetrator together at the same time as the straight portion of the fibers increase the tensile properties. The woven pattern also could be extended along the length of the long rod in a three dimensional weave. Each fiber arrangement would be encapsulated with an appropriate matrix material such as depleted uranium, liquid phase sintered tungsten, etc.. The extended weave has the advantage of providing multiple front ends; as the penetrator's front end is eroded away during impact, a new woven surface is constantly appearing.

OBJECTS OF THE INVENTION

Accordingly, it is an object of this invention to provide a kinetic energy projectile of superior penetration capabilities.

Another object of this invention is to improve the strength and toughness of kinetic energy penetrator rods, particularly of fiber reinforced rods.

Other objects and advantages of this invention will become obvious from the specification and figures, in which:

LIST OF FIGURES

DETAILED DESCRIPTION OF THE INVENTION

Figure 1A:
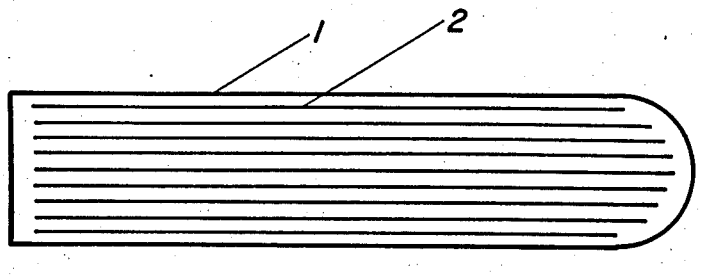
FIG. 1A shows a straight fiber reinforced penetrator of the rod variety.
Figure 1B:
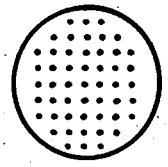
FIG. 1B is its end view.
Figure 2A:
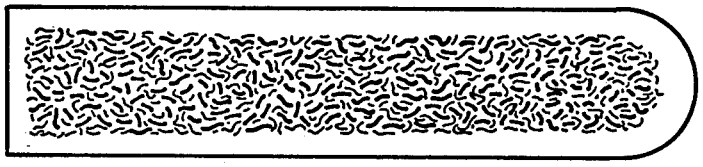
FIG. 2A shows a fiber reinforced penetrator of the chopped-fiber type.
Figure 2B:
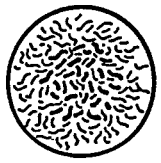
FIG. 2B is its end view.
Figure 3A:
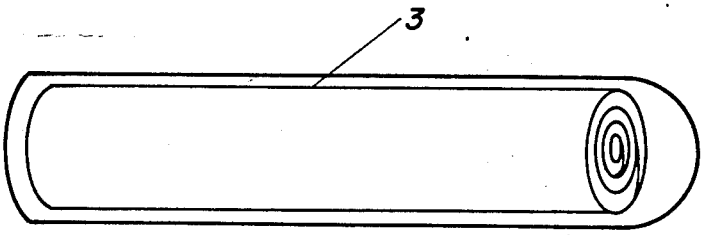
FIG. 3A shows a reinforced penetrator of the rolled-sheet type.
Figure 3B:
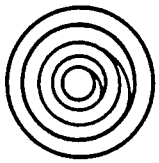
FIG. 3B is its end view.

FIGS. 1A–1B through 3A–3B respectively, show some of the conventional methods of reinforcing rod penetrators. As was mentioned previously, these fiber and rolled sheet varieties lose desired penetration ability too quickly during target impact. In the case of FIG. 1A for example, the long straight fibers splay open upon impact—as shown by the arrows. The same is true for the chopped fiber (FIG. 2A) and the rolled sheet (FIG. 3A) types. Thus, the open endedness of the fiber or sheet at the impact end of the penetrator can cause the front end of the rod to splay or split apart during impact, thereby reducing penetration ability.

Figure 4A:
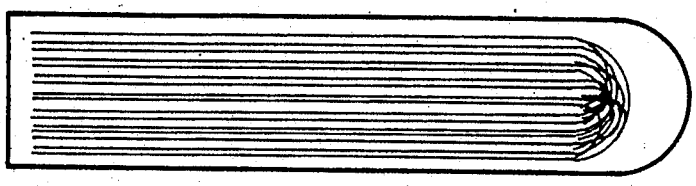
FIG. 4A shows a doubled over fiber reinforced penetrator.

One inventive concept of Applicants to overcome the splaying-out, and other difficulties in the prior art, is shown in FIG. 4A where the front end of the fibers are purposely bent inwardly, toward the central axis of the penetrator. The fibers cannot splay outwardly upon impact this way; on the contrary, they are pushed inwardly where they collect together up front, thus strengthening the rod's front end all the more. Alternatively, the fibers can be doubled over in a random fashion at the front end.

Figure 5A:
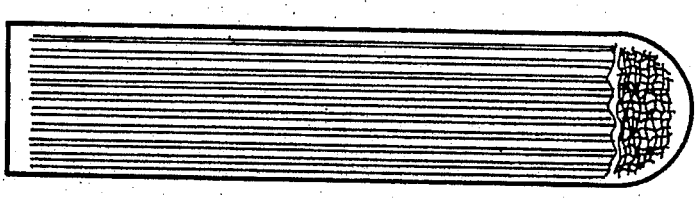
FIG. 5A shows a woven-end fiber reinforced penetrator.

Another inventive concept of Applicants is to provide a woven front end, as is shown in FIG. 5A. It is stressed that the front end of the penetrator cannot now splay open upon impact because the fibers are knitted together. Such arrangement is certainly a decided improvement upon the unprotected versions shown in FIGS. 1A, 2A, and 3A and even offers more assurance than the improvement shown in FIG. 4A.

Figure 6A:
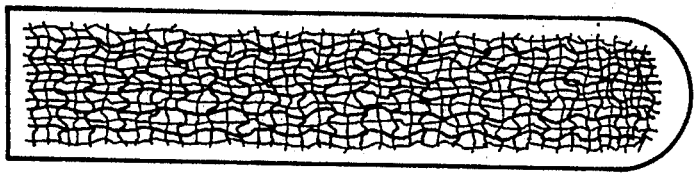
FIG. 6A shows a woven-core fiber reinforced penetrator.

Applicants also have invented the great improvement to reinforcement of long rod penetrators as shown in FIG. 6A. In this design, the fibers are woven throughout the core. At each stage of the penetrator core, therefore one finds the fibers always knitted together. The advantage of this arrangement is to have the fiber core always intact, so that it cannot splay open, at all stages even as the front end of the rod is eroded away upon impact. It must be remembered that the fiber core is itself imbedded in extremely hard materials such as depleted uranium mentioned earlier, or liquid phase sintered tungsten. The fiber weave shown in FIG. 6A also could be modified to eliminate the central woven core. This would yield a hollow, closed front end, woven wire-cage reinforcement for the penetrator.

Suitable weave patterns for the core include the 3-D cylindrical and 4-D layup type patterns used in the Textiles field. These and other weaves can be found illustrated in an article by Allen J. Klein, appearing in "Advanced Materials And Processes", March, 1986, pp. 40–43, entitled "Which Weave To Weave", which is incorporated by reference herein.

LPS or powder metal techniques for fabricating penetrators require that a woven core be placed in a mold. The technique that follows is typical: The mold, with cage or core in place, is then filled with powder such as DU or tungsten LPS, and the powder is compacted by vibration and/or jolting, followed by sintering and hot isothermal pressing (HIP).

Figure 4B:
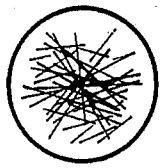
FIG. 4B is its end view.
Figure 5B:
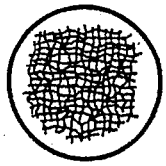
FIG. 5B is its end view.
Figure 6B:
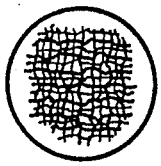
FIG. 6B is its end view.
Figure 7:
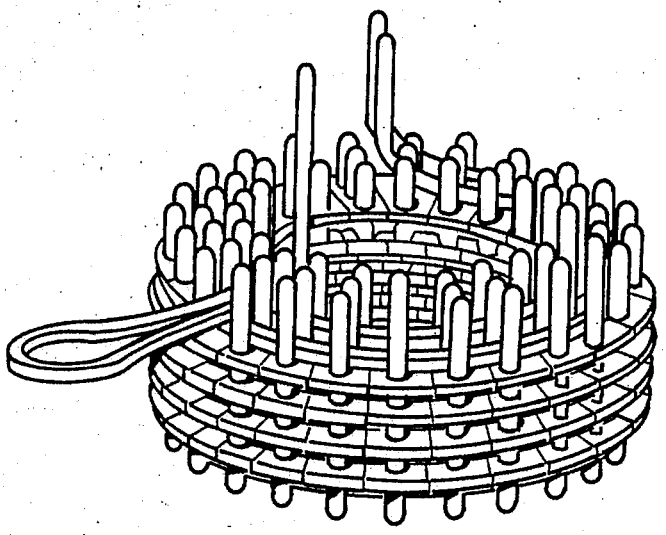
FIG. 7 shows a 3-D cylindrical weave pattern for the penetrator core.
Figure 8:
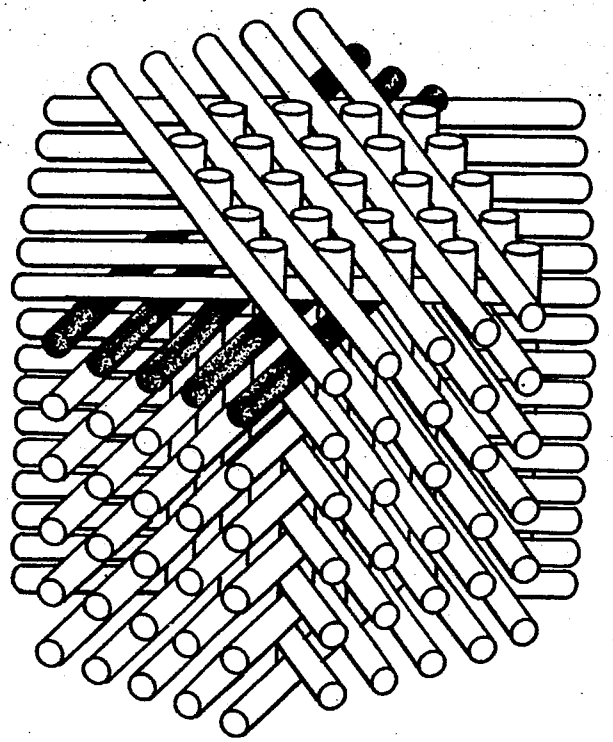
FIG. 8 shows a 4-D layup weave pattern for the penetrator core.

Another method of fabricating the penetrator is described as follows: a very strong wire, such as tungsten-hafnium-carbide with a tensile strength of 200,000 pounds per square inch (psi), should be used for the penetrator reinforcement material. The wire is formed into the reinforcement configuration (FIGS. 4, 5, 6, or the shaped wire cage); special attention must be paid to the weave - texture, tightness, wire thickness, etc.. This configuration then is coated (covered, filled in, encapsulated) by an arc-spray technique. A suitable container/-chamber is constructed to mount and hold the penetrator wire reinforcement. The holding apparatus is such that the reinforcement can be rotated and repositioned to allow the arc-spray to impinge on all portions of the wire array. Thus, coating and filling in the void areas with arc material. The arc will melt suitable materials, such as tungsten, tungsten alloy, etc. wire of appropriate thickness. The molten material then is struck by a jet of inert gas, such as argon, which causes the material to vaporize and be deposited on the wire array. The wire array is moved and rotated within the vapor stream to form a solid rod. The atmosphere in the chamber, which was originally evacuated, is inert due to the jet of inert gas; pressure is controlled by a relief valve. The coated rod then is subjected to a hot-isostatic pressing operation to densify the composite rod.

In addition to employing the arc-spray technique described above, spray methods can be employed for penetrator fabrication such as plasma-arc spray, plasma vapor deposition, and chemical vapor deposition techniques to name a few.

Wire reinforced tungsten is one of the strongest composities known. Combined with the cage array of wires, this method of applying the tungsten or other matrix material will produce a fine grained structure which will provide penetrators with improved properties and increased penetration performance. Such composite rod material also may have uses in areas other thau penetrators.

While the invention may have been described with respect to a particular embodiment or embodiments. other variations of this invention are possible and included herein, such as by substitution and modification of analogous structures, as will occur to one skilled in this art.

What is claimed is:

1. An improved penetrator rod for a kinetic energy projectile comprising a long metallic rod having an imbedded core of long fibers, said fibers woven together at the front end of said penetrator rod.

2. The penetrator rod of claim 1 wherein the fibers are woven throughout in an extended weave, along the entire length of the rod.

3. An improved penetrator rod for a kinetic energy projectile comprising a long metallic rod having an imbedded core of long fibers, said fibers doubled over and/or bend inwardly together at the front end of said penetrator rod, towards the central axis of said rod or in a random pattern.

4. An improved penetrator rod for a kinetic energy projectile comprising a long metallic rod having an imbedded core of long fibers, said fibers woven together to form a hollow, closed front end, woven wire cage.

5. The penetrator rod of claim 1 wherein said fiber is tungsten-hafnium-carbide.

6. The penetrator rod of claim 2 wherein said fiber is tungsten-hafnium-carbide.

7. The penetrator rod of claim 3 wherein said fiber is tungsten-hafnium-carbide.

8. The penetrator rod of claim 4 wherein said fiber is tungsten-hafnium-carbide.

9. The penetrator rod of claim 1 wherein said fiber core is imbedded in depleted uranium, liquid phase sintered tungsten metals, alloy variations thereof, or any other suitable penetrator material - including powder metal alloy mixtures as a matrix material.

10. The penetrator rod of claim 2 wherein said fiber core is imbedded in depleted uranium, liquid phase sintered tungsten metals, alloy variations thereof, or any other suitable penetrator material - including powder metal alloy mixtures as a matrix material.

11. The penetrator rod of claim 3 wherein said fiber core is imbedded in depleted uranium, liquid phase sintered tungsten metals, alloy variations thereof, or any other suitable penetrator material - including powder metal alloy mixtures as a matrix material.

12. The penetrator rod of claim 4 wherein said fiber core is imbedded in depleted uranium, liquid phase sintered tungsten metals, alloy variations thereof, or any other suitable penetrator material - including powder metal alloy mixtures as a matrix material.

13. Method of fabricating a fiber reinforced penetrator rod for a kinetic energy projectile, comprising the steps of: forming wire configurations; supporting said wire configurations on a movable, rotating device; melting metals, for coating, by an electric arc to form molten metal; directing a jet of inert gas at said molten metal to vaporize said molten metal and deposit it upon said wire configuration so that it can be coated on all sides to form a composite rod; and pressing said rod, by hotisostatic pressing, to densify said rod.

14. The method of claim 13 wherein other deposition techniques are employed such as: plasma-arc spray, plasma-vapor deposition, and chemical vapor deposition.

15. The method of claim 13 wherein said wire is tungsten- hafnium-carbide and said molten metal is tungsten alloy.

* * * * *